United States Patent [19]
Gladwin

[11] 3,910,159
[45] Oct. 7, 1975

[54] APPARATUS FOR FORMING LARGE RADIUS, COMPOUND CURVED SURFACES UPON LARGE PLATE-LIKE WORKPIECES

[76] Inventor: Floyd R. Gladwin, P.O. Box 1113, Southgate, Mich. 48192

[22] Filed: Feb. 15, 1974

[21] Appl. No.: 442,804

[52] U.S. Cl. .................... 90/15 A; 51/127; 90/21 B
[51] Int. Cl.² .......................................... B23C 1/06
[58] Field of Search ...... 90/21 B, 21 R, 21 A, 21 C, 90/21 D, 15 A, 13.5, 13.2; 51/127

[56] References Cited
UNITED STATES PATENTS

| | | | |
|---|---|---|---|
| 551,717 | 12/1895 | Bushhop et al. | 51/127 |
| 1,332,437 | 3/1920 | Ely | 90/15 A |
| 3,464,314 | 7/1969 | Gladwin | 90/21 R |

Primary Examiner—Harrison L. Hinson
Assistant Examiner—Leon Gilden
Attorney, Agent, or Firm—Cullen, Settle, Sloman & Cantor

[57] ABSTRACT

A horizontally arranged workpiece supporting table is reciprocally mounted upon a support bed and guided for longitudinal movement, relative to the bed, along a vertically arranged, horizontally axised arc-like curve, beneath a forming tool mounted above the bed upon a slide member moved transversely of the bed along a transversely directed, vertically arranged, horizontally axised arc-like curve. The up and down movement of the workpiece, as the table reciprocates in its curved path beneath the tool, coupled with the up and down transverse movement of the tool forms a predetermined, large radius, compound curved surface upon a plate-like workpiece supported upon the table.

6 Claims, 10 Drawing Figures

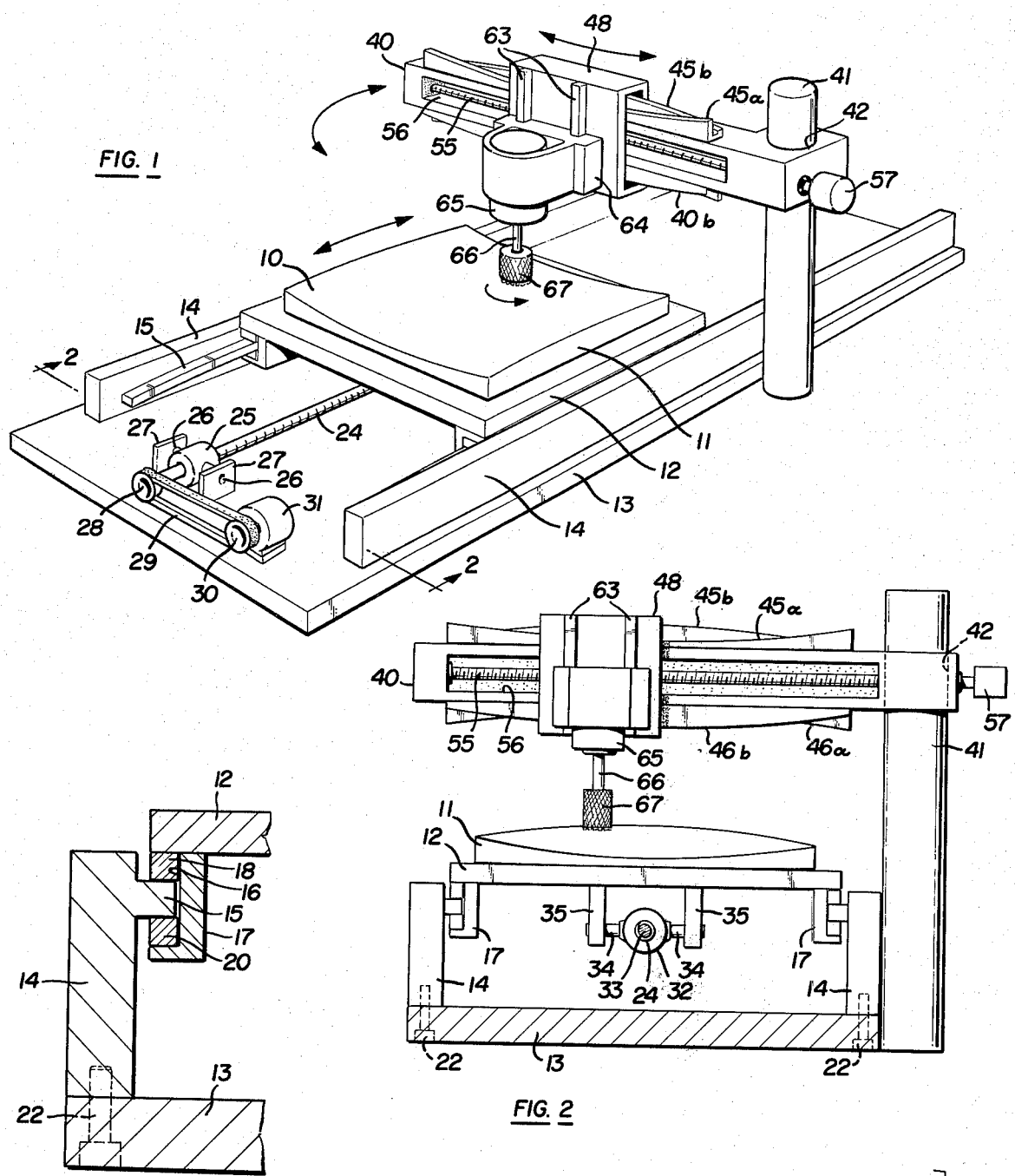
FIG. 1
FIG. 2
FIG. 4
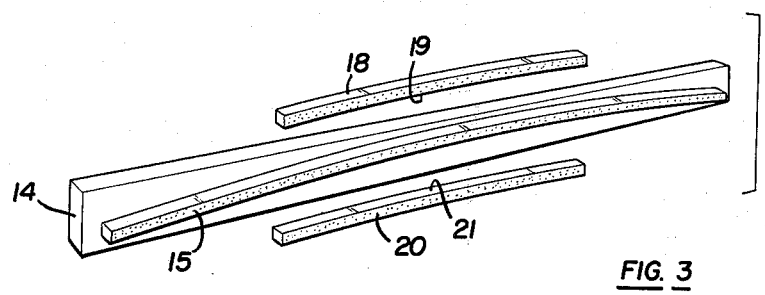
FIG. 3

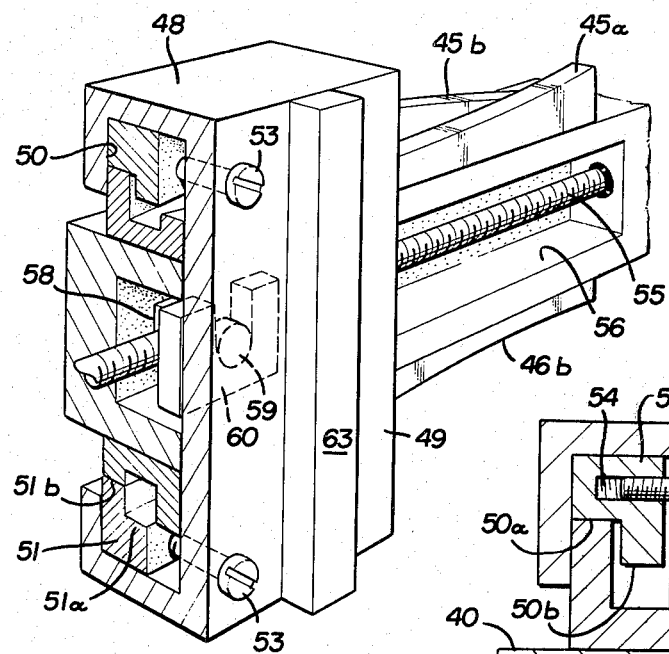
FIG. 5
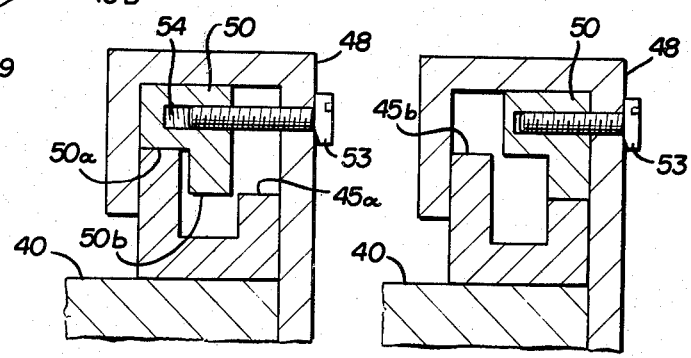
FIG. 6    FIG. 7
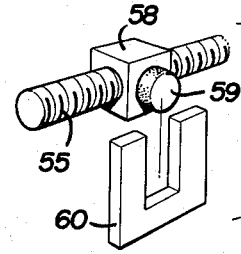
FIG. 8
FIG. 9
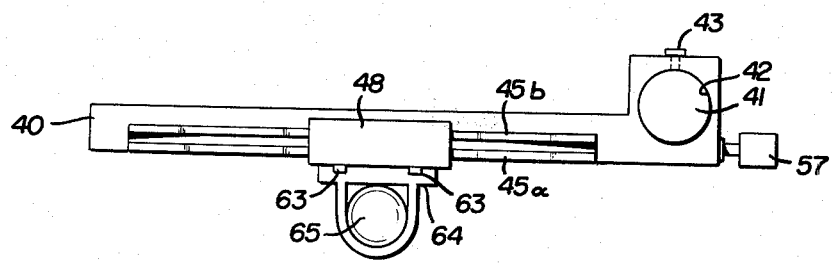
FIG. 10
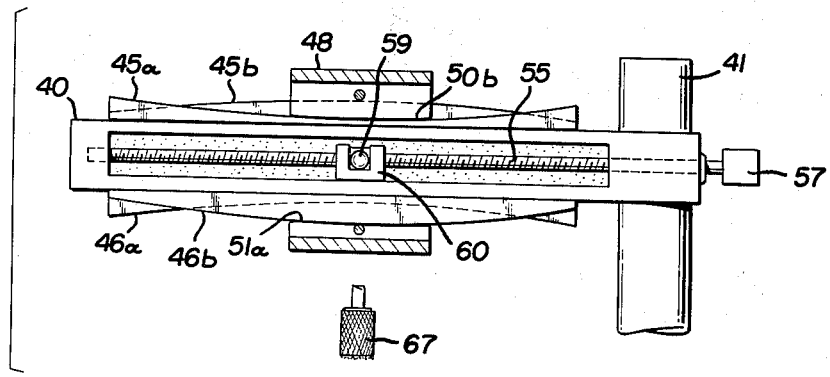

APPARATUS FOR FORMING LARGE RADIUS, COMPOUND CURVED SURFACES UPON LARGE PLATE-LIKE WORKPIECES

BACKGROUND OF INVENTION

The apparatus herein is of the general type as that disclosed in my prior U.S. Pat. No. 3,464,314, issued Sept. 2, 1969, and in my copending application, Ser. No. 320,106, filed Jan. 2, 1973. This type of apparatus is used for milling or forming a curved surface, such as on the order of a 20 foot radius arc curvature upon the face of a large, flat metal plate which, for example, may be on the order of 2 by 4 feet by several inches in thickness. The curved surface may be either concave or convex.

Such type plates are used, by way of example, as guides and dies in the continuous casting of steel ingots and the like. Thus, accuracy of the dimensions of the curved surface must be closely maintained.

In the apparatus disclosed in my prior patent, identified above, the workpiece plate is supported upon a table which in turn, is mounted upon a support bed and guided for reciprocal movement upon the bed. The guide means, in the form of tracks or rails, cause the table to reciprocate along an arcuate path, which arc is arranged in a vertical plane. Thus, a milling or other type of cutting or forming tool applied against the upper surface of the plate forms the surface into the predetermined curve as the plate reciprocates beneath the tool.

In my above identified application, the apparatus generally comprises a horizontally reciprocal table upon which the workpiece plate is supported, with the forming tool being located above the table and movable transversely to the direction of reciprocation of the table along a vertically oriented arcuate path. This apparatus is generally less expensive to construct and its operating wear is considerably less than the apparatus of my prior patent. In both types of the above apparatus, a uni-directional curve is formed upon the surface of the workpiece.

However, in certain applications, particularly for certain die or guide shapes required in the continuous casting of steel ingots, it is desirable to form multiple or compound curves upon the work surfaces. For all practical purposes, this has not been possible either with the above or any other available apparatus. Thus, the invention herein relates to an improvement to the foregoing apparatus, including combining various portions of each to thereby produce an apparatus which is useful for forming multiple curve or compound curve surfaces upon flat metal plates of large size in one milling or forming operation. Significantly, the workpiece surface may be formed either concave or convex with varying curvatures on portions thereof and to a high degree of accuracy.

SUMMARY OF INVENTION

The invention herein contemplates positioning a flat, large, plate-like workpiece upon a support table which is mounted upon a support bed by means of guides, wherein the table is reciprocated longitudinally of the bed along a curvalinear path which generally corresponds to an arc of a circle which is vertically arranged or horizontally axised, and in a plane extending longitudinally of the bed.

A cross member extends transversely of the bed, over the path of reciprocation of the table, and carries a slider formed to slide back and forth along the length of the cross member and guided in its movement in an arcuate path which is transverse to the path of movement of the table. A cutting or forming tool is mounted upon the slider and is arranged to operate upon the upper surface of the workpiece. For certain applications, the cross member may be adjusted angularly relative to the longitudinal axis of the support bed.

With this apparatus, the workpiece is reciprocated up and down along an arcuate path in one direction, the longitudinal direction of the bed, and the forming tool is moved up and down in an arcuate path transversely to the direction of the workpiece so that the combined relative movements of the workpiece and the tool produce predetermined multiple or compound curvatures upon the workpiece surface.

The apparatus disclosed herein is relatively simple in construction and the various guides may be removed and interchanged with guides of different curvatures to thus produce predetermined curved surfaces of varying radii.

The foregoing and other objects and advantages of the invention herein will become apparent upon reading the following description, of which the attached drawings form a part.

DESCRIPTION OF DRAWINGS

FIG. 1 is a perspective view of the apparatus herein.

FIG. 2 is a cross-sectional front elevational view of the apparatus, taken in the direction of arrows 2—2 of FIG. 1.

FIG. 3 is a perspective view of the table supporting guide means, with the parts separated.

FIG. 4 is an enlarged, fragmentary cross-sectional view showing the interconnection of the guide means of the table and support bed.

FIG. 5 is a cross-sectional, perspective view of the cross member and slider upon which the forming tool is mounted.

FIG. 6 is a cross-sectional view, to an enlarged scale, showing the guide means mounted in the slider upon the cross member.

FIG. 7 is a view similar to FIG. 6 but showing the guide means in a second supporting position.

FIG. 8 is a fragmentary, perspective view of a portion of the slider drive means.

FIG. 9 is a top plan view of the cross member and slider, and

FIG. 10 is a front, elevational view, partially in cross-section of the slider and cross member.

DETAILED DESCRIPTION

The purpose of the apparatus herein is to form a multiple or compound curved surface 10 upon a large size, flat, plate-like workpiece 11. The curved surface may be either concave or convex in nature and the curvature varies along the surface.

The plate is fastened, by any conventional shop clamps or by bolts or the like, upon the upper surface of a table 12 which is mounted for reciprocation upon a support bed 13. The movement of the table is controlled by guide means which include a pair of guide rails 14 having inwardly extending curved tongues 15, for engagement within grooves 16 formed in groove rails 17 secured to the bottom surface of the table. The opposing grooves 16 are lined with upper bushings 18 having a concave surface 19 and lower bushings 20 having an upper convex surface. The bushings are curved to engage the curved tongues 15 in face to face relationship.

As shown in FIG. 4, the rails 14 are mechanically secured to the bed 13, as by means of screws 22 or the like. Likewise, the bushings are mechanically fastened within the grooves 16 by any suitable mechanical fasteners. Thus, the rails may be removed and replaced with corresponding rails of different curvature tongues or tongues which are reversely curved. Correspondingly, the bushings may be removed and replaced with others matching the curvatures of the tongues. Likewise, the rails may be reversed so that their tongues extend outwardly and engage within inwardly extending grooves.

To drive the table back and forth along the length of the bed, a drive screw 24 is provided. One end of the screw extends through a trunion-type bushing 25 having side studs 26 pivotally connected to support brackets 27 mounted upon the surface of the bed. A sprocket 28 connected to the free end of the screw is connected by a chain 29 to a sprocket 30 mounted upon a reversible motor 31. Thus, operation of the motor in one direction or the other, by means of suitable, conventional controls (not shown) rotates the screw 24 in one or the other direction.

The opposite end of the screw extends through a trunion bushing 32 having a threaded opening for receiving the screw, and side studs 34 pivotally connected to brackets 35 mounted on the bottom surface of the table (see FIG. 2). Thus, rotation of the screw in one direction drives the table correspondingly and reversal of the screw direction reverses the direction of movement of the table. The foregoing drive means for the table is illustrative and other suitable types of drive means may be utilized.

Located above the bed, at roughly the middle thereof, is a cross-member 40 having an end mounted upon a support post 41 which extends through an opening 42 formed in the cross member. A suitable clamping means, as for example a set screw type of clamp 43 (see FIG. 9) fixes the cross member relative to its support post. Thus, the height of the cross member of the bed, as well as its angularity relative to the longitudinal axis of the bed, may be adjusted within limits. However, alternatively, for certain types of heavy duty operation, it may be desirable to provide a second support post for supporting the opposite end of the cross member, in which case it may not be possible to adjust the angularity of the cross member.

Fastened upon and extending the length of the upper surface of the cross member are a pair of curved tracks, namely, concave track 45a and convex track 45b. Likewise, secured upon the lower surface of the cross member are curved tracks, namely, concave track 46a and convex track 46b. The concave upper track is aligned with the convex lower track and the convex upper track is aligned with the concave lower track for reasons to be described below.

Mounted upon the cross member is a slider 48 having a front plate 49 and containing an upper guide bar 50 and a lower guide bar 51. Each of the guide bars are provided with a pair of curved surfaces for face to face engagement with a corresponding cross member curved track. Thus, the upper guide bar is provided with a concave surface 50a and an adjacent, but slightly spaced apart, convex surface 50b. Likewise, the lower guide bar is provided with a concave surface 51a and an adjacent convex surface 51b.

The guide bars are loosely fitted within channels formed in the slider and may be moved forwardly, i.e., towards the front plate, or rearwardly by means of screws 53 extending through the front plate 49 and into screw holes 54 in the guide bars. Thus, the curved surfaces of the guide bars may be so positioned as to engage either of the two pairs of tracks, i.e., the pair formed by tracks 45a and 46b or the pair formed by tracks 45b and 46a. Depending upon which of the tracks are engaged, the slider may be moved along the length of the cross member in an arcuate path which is either convex or concave relative to the table beneath the cross member.

To move the slider, a drive screw 55 is journalled within an open channel 56 formed in the cross member. One end of the drive screw is driven by a reversible motor 57 operated by conventional controls. The screw passes through a centrally located nut 58 having a circular boss 59 which is inserted within a U-shaped bracket 60 fastened to the inside surface of the front plate 49. Thus, operation of the motor and rotation of the drive screw results in the slider moving in one direction or the other along the length of the cross member.

Fastened upon the front plate are vertical guide rails or tracks 63 which engage with and support a vertically movable plate 64 upon which a motor 65 is mounted. A suitable clamping means, i.e., set screws or the like, may be provided to fix the plate 64 relative to the front plate. A shaft 66 driven by the motor carries a downwardly extending milling cutter 67 or some other cutting or grinding or forming tool. Although the drawings illustrate the tool as being vertically axised, the tool may be horizontally axised by providing appropriate drive gearing.

OPERATION

In operation, a flat workpiece plate is clamped upon the upper surface of the reciprocating table 11. Prior to that time, suitably curved rails 14 and correspondingly matched groove inserts 18 and 20 are installed to guide the curvalinear movement of the table. Likewise, appropriately curved tracks are fastened upon the cross member with corresponding bars fitted within the slider. Thereafter, operation of the motor 30 causes the drive screw 24 to alternately rotate in one direction and then the other to thereby reciprocate the table along the longitudinal direction of the bed, but in an arcuately curved path. Similarly, operation of the motor 57 moves the slider and its depending tool in an arcuately curved path which is transversely directed relative to the path of the table. By preselecting the speeds of movement of the slider and of the table, as well as by the preselection of the curvatures of the guide means for the slider and the table, predetermined curvatures may be formed upon the workpiece surface. By positioning the workpiece off center relative to the center of the arc of travel of the table and/or off center relative to the arc of travel of the tool, the curvatures upon the workpiece may be so formed that one edge of the workpiece is thicker than the other edges, etc. Where desired, the angularity of the cross member may be adjusted to off-perpendicular relative to the axis of the bed to thereby add additional curvatures to the plate.

Having fully described an operative embodiment of this invention, I now claim:

1. An apparatus for forming large radius, compound curves upon a surface of a large, plate-like workpiece, comprising:

an elongated, horizontal supported bed with a horizontally arranged table mounted upon the upper surface of the bed for horizontal reciprocal movement along the length of the bed, with the top surface of the table forming a workpiece support for holding a large, horizontally arranged plate-like workpiece;

interengaged, cooperating guide means formed on the table and bed for guiding the reciprocal movement of the table along the length of the bed, with said guide means being curved along a large radius arc arranged in a vertical plane wherein the longitudinal reciprocal movement of the table relative to the length of the bed is along an arcuate, horizontally axised, path of a predetermined arcuate radius;

a cross member secured at a spaced distance above the bed and between the opposite ends thereof and extending transversely of the bed and over the table transversely to the direction of reciprocation of the table;

a slide member mounted upon the cross member for movement along the length of the cross member and interengaged, cooperating guide means formed on the slide member and cross member for guiding the slide member along the length of the cross member, with said guide means being curved along a large radius arc located in a vertical plane which is transverse to the plane of the arc of the table guide means, wherein the slide member may be moved back and forth along the cross or member and above the top surface of the reciprocating table in an arcuately, generally horizontally axised, curved path extending transversely of the bed, said guide means including a first track mounted upon and extending along the length of the cross member, with the upper surface of the track being curved to a predetermined arcuate curvature; and track engaging means formed on the slide member for engaging with the track upper surface for supporting the slide member upon the track, said track engaging means having a large radius curved surface for face to face guiding engagement with the upper surface of the track wherein the slide member moves in its curved path along the track; and said track being removable and replaceable by a corresponding track of different curvature for thereby varying the path of movement of the slide member;

tool means mounted upon and depending beneath the slide member for movement with the slide member and for operating upon the upper surface of the workpiece as it reciprocates upon the table beneath the cross member, whereby the tool forms the upper surface of the workpiece into large compound curves.

2. An apparatus as defined in claim 1, and means for mounting said cross member at predetermined angles relative to the longitudinal axis of the bed for thereby varying the curves formed upon the workpiece upper surface.

3. An apparatus as defined in claim 1, and said table guide means and said slide member guide means, each being removable and replaceable with corresponding guide means of different arc radii for thereby varying the curvature of the paths of movement of the table and slide member.

4. An apparatus as defined in claim 1, and said table guide means comprising interfitted tongue and groove members secured to the table and bed, with the groove and the groove member being lined with removable bushings having arcuately curved tongue engaging surfaces engaged with corresponding curved surfaces found on the tongue of the tongue member, with the bushings and tongue being removable and replaceable by corresponding, but differedly curved, bushing and tongues for thereby changing the curvature of the path of movement of the table.

5. An apparatus as defined in claim 1, and said guide means including an additional track vertically aligned with the first track, said additional track having an arcuate curvature complementary in shape to the curvature on the first track, and said track engaging means including an additional large radius curved surface for face to face guiding engagement with the additional track.

6. An apparatus as defined in claim 1, and said guide means including an additional track parallel to and horizontally spaced from the first track, said additional track having an arcuate surface with a different radius of curvature than the first track, and said track engaging means including a second curved surface for selective face to face guiding engagement with the additional track.

* * * * *